US008260975B1

(12) United States Patent
Schanin et al.

(10) Patent No.: US 8,260,975 B1
(45) Date of Patent: Sep. 4, 2012

(54) CONSUMER ELECTRONICS CONTROL (CEC) PROCESSOR

(75) Inventors: David J. Schanin, Denver, CO (US); Anthony Anzelmo, Bolivia, NC (US)

(73) Assignee: Hydra Connect LLC, Denver, CO (US)

( * ) Notice: Subject to any disclaimer, the term of this patent is extended or adjusted under 35 U.S.C. 154(b) by 0 days.

(21) Appl. No.: 13/160,475

(22) Filed: Jun. 14, 2011

(51) Int. Cl.
*G06F 3/00* (2006.01)
*G06F 13/00* (2006.01)

(52) U.S. Cl. .......... 710/8; 710/2; 710/5; 710/15; 710/36

(58) Field of Classification Search ........................ None
See application file for complete search history.

(56) References Cited

U.S. PATENT DOCUMENTS 7,822,879 B2 10/2010 Lida et al.
2006/0095596 A1 5/2006 Yung et al.
2009/0256963 A1 10/2009 Sato
2009/0295679 A1* 12/2009 Lida et al. ...................... 345/1.1
2009/0295680 A1 12/2009 Lida et al.
2009/0295990 A1 12/2009 Lida et al.
2009/0295996 A1 12/2009 Lida et al.
2009/0296002 A1 12/2009 Lida et al.
2009/0296712 A1 12/2009 Lida et al.
2009/0327474 A1 12/2009 Ida
2010/0053463 A1 3/2010 Yu et al.
2010/0079674 A1* 4/2010 Mizuno et al. ................ 348/575
2010/0225814 A1 9/2010 Kozono et al.

OTHER PUBLICATIONS

HDMI specification 1.3, 2006, HDMI.org [online, accessed on Feb. 10, 2012], URL: http://www.hdmi.org/manufacturer/specification.aspx.*
Crestron Electronics, Inc., "Crestron Digital Media Design Guide", Rockleigh, NJ, 2009, see pp. 3-4, 6.
Sony Corporation, "Sony HDMI Control Guide: Operating Instructions: Bravia Theatre Sync", 2007, Malaysia, see p. 1.

* cited by examiner

*Primary Examiner* — Scott Sun

(57) ABSTRACT

An HDMI™ (High-Definition Multimedia Interface) switch includes a CEC (Consumer Electronics Control) processor for controlling high-definition audio-visual (AV) equipment. The CEC processor accepts user commands and translates them to control HDMI devices over HDMI; the translations can be manufacturer specific so that devices with different CEC implementations can be combined in a single system. CEC communications between HDMI devices is precluded or at least controlled to avoid problems due to incompatible CEC implementations and unwanted interactions. The CEC processor causes the HDMI switch to appear as an HDMI source to HDMI sink devices and as an HDMI sink to HDMI source devices for the purposes of assigning physical addresses. While CEC is designed to handle AV systems having only one sink (display), the novel HDMI switch provides for CEC-controlled AV systems with multiple displays, e.g., in different rooms.

4 Claims, 4 Drawing Sheets

DEVICE DATABASE 234

| PORT | DEVICE TYPE | CODE SET |
|---|---|---|
| P1 | SINK | A |
| P2 | SINK | B |
| P3 | SOURCE | C |
| P4 | SOURCE | D |

| CODE DATABASE 236 | | | |
|---|---|---|---|
| USER COMMANDS | AQUOSNET SHARP | BRAVIALINK SONY | VIERALINK PANASONIC / JVC |
| | | | |
| | | | |
| | | | |
| | | | |
| USER COMMANDS | REGZALINK TOSHIBA | EASYLINK PHILIPS | NETCOMMAND MITSUBISHI |
| | | | |
| | | | |
| | | | |
| | | | |
| USER COMMANDS | ANYNET SAMSUNG | SIMPLELINK LG | RIHD ONKYO |
| | | | |
| | | | |
| | | | |
| | | | |

CODE SETS

FIG. 3

CONSUMER ELECTRONICS CONTROL (CEC) PROCESSOR

BACKGROUND

Custom home entertainment systems can include matrix switches controlled by a central control system that allow a user to select among plural sources for video contents and among plural displays on which to view content. Such arrangements can allow different family members to view different contents in different rooms and allow a viewing in progress to follow a viewer who moves from one room to another. This arrangement also allows for all of the various video sources to be hidden in a remote location, leaving only the video display visible in the living areas.

However, the transition to high-definition video has introduced some challenges to matrix switching. The predominant audio and video interconnect system for high-definition video is HDMI, which includes an optional Consumer Electronics Control (CEC) protocol that allows any HDMI connected device to issue commands to any other HDMI connected device that supports the CEC protocol. The CEC protocol assumes a single video sink, e.g., display, and cannot readily be used with a home entertainment system having the two or more video sinks. Moreover, CEC implementations tend to be manufacturer-specific, which complicates control of home entertainment systems with devices from different manufacturers. While video devices can be controlled without using CEC, e.g., using a network of IR transmitters, such approaches tend to be cumbersome, expensive, and unreliable. What is needed is a more convenient and elegant approach to selecting HDMI sources and sinks.

BRIEF DESCRIPTION OF THE DRAWINGS

FIG. 3 illustrates a code database of the CEC command processor of FIG. 2.

DETAILED DESCRIPTION

Figure 1:
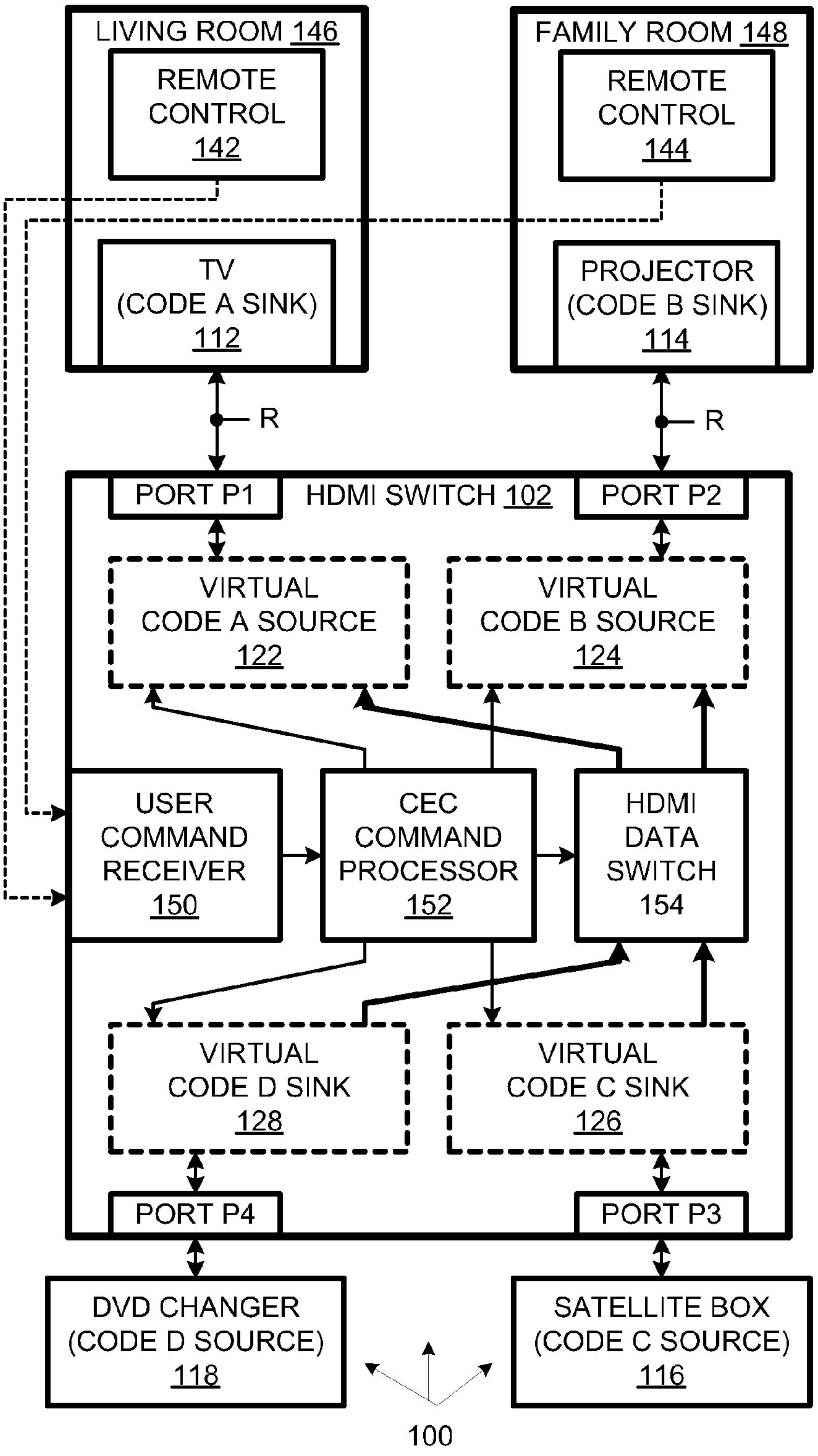
FIG. 1 is schematic diagram of a home entertainment system in accordance with an embodiment of the invention.

In accordance with the present invention, a home-entertainment system 100 includes an HDMI switch 102 connected to a television (TV) 112, a projector 114, a satellite box 116, and a DVD player 118, as shown in FIG. 1, respectively connected to HDMI ports P1-P4. HDMI switch 102 provides complementary virtual HDMI devices 122, 124, 126, and 128 to interact respectively with devices 112, 114, 116, and 118 so that the latter can be controlled using CEC commands, including manufacturer-specific CEC extensions; this allows CEC physical addresses to be assigned to virtual and actual HDMI devices according to the CEC specification. The HDMI switch prevents CEC commands from being transmitted from one HDMI port to another HDMI port, this allows more than one CEC sink to be used and avoids conflicts and collisions that might otherwise occur due to the different CEC extensions, e.g., implemented by different manufacturers. Since CEC commands are used for device control, workarounds such as infrared-based systems are not needed.

The HDMI™ (High-Definition Multimedia Interface) standard developed and licensed by the HDMI consortium, is a high-speed digital interface for communicating audio and video signals between sources (such as DVD players, satellite boxes, cable boxes, etc.) and sinks (typically video display devices such as televisions or projectors). Consumer Electronics Control (CEC) refers to an auxiliary communication protocol and interconnect which is part of the HDMI standard that enables control messaging between members of an HDMI connected system. Devices which support CEC enable a user to manage a plurality of sources connected via HDMI to run operations such as 'one touch play'. Using CEC, the user may, for example, use one remote control to turn on a sink, source, and AV (audio-visual) at the same time, and to adjust the system volume of that receiver. The commands required for this are delivered by the remote control to a single member of the HDMI system, usually the sink, which then uses the CEC protocols to communicate to the other members of the system what functions they should perform.

The CEC interconnect uses a one-wire shared bus topology included in a standard HDMI connection cable. Being a single wire, multi-drop interconnect, CEC requires physical addresses for all members. Normally, upon hot-plugging, each CEC source device obtains a physical address by reading the Extended Device Identification Data (EDID) of the system's single sink device, to which it is attached. Logical addresses are then allocated based on product type using automatic mechanisms built into CEC protocols. CEC devices always have both physical and logical addresses.

The CEC specification includes support for customized commands. This enables different vendors to create proprietary CEC based networks between products of their own. Examples of such modified CEC base networks include: Anynet (Samsung), Aquos Link (Sharp), BraviaLink (Sony), RegzaLink (Toshiba), RIHD (Onkyo), Simplink (LG), VieraLink (Panasonic/JVC), Easylink (Philips) and NetCommand for HDMI (Mitsubishi).

It should be noted that the CEC interconnect and message topology is designed to only support a tree structure topology wherein it is assumed that a single sink is at the top of the tree and is the sole arbiter for the allocation of physical addresses to all devices directly connected to it. This presents a challenge in the design of multi-room home entertainment systems, e.g., in which AV sources provide content to plural displays in plural rooms. HDMI switch 102 addresses this problem.

HDMI switch 102 includes a user-command receiver 150 for receiving user commands, e.g., via remote controls 142 and 144. Remote control 142 is programmed to control television 112 and to select the content to be displayed on television 112. So that it can be used by a person viewing television 112, remote control 142 is typically kept in the same room that television 112 is situated in. In the illustrated case, this is living room 146. Remote control 144 is programmed to control projector 114 and to select the contents to be displayed by projector 114. So that it can be used by a person viewing a screen on which projector 114 projects contents, remote control 144 is typically kept in the same room that projector 114 (or at least its screen) are situated in. In the illustrated case, this is family room 148. More generally, the invention provides for HDMI switches with any number of source and sink ports, and remotes for each sink or each room having a sink. HDMI switches can have dedicated source and sink ports or ports that can be selective configured to serve as sink or source ports.

Remotes 142 and 144 typically communicate with HDMI switch 102 wirelessly using wall-penetrating RF signals (as opposed to infra-red signals); in an alternative embodiment, infra-red is used. To this end, HDMI switch 102 includes a user-command receiver 150. Alternatively, remotes can communicate with a high-level control center which, in turn, communicates with an HDMI switch, e.g., via a wired interface. Receiver 150 demodulates user commands and provides them to a CEC command processor 152 of HDMI switch 102.

CEC command processor 152 is responsible for creating complementary (to connected real HDMI devices) virtual HDMI devices 122, 124, 126, and 128. For example, CEC command processor 152 manages address assignment from sinks and to sources. In addition to sources and sinks, the CEC specification provides for "repeaters", e.g., AV receivers. For example, AV receivers can be inserted at nodes R in FIG. 1. In this arrangement, the connected sink provides a physical address to the repeater and the repeater assigns a physical address to the HDMI switch port to which it is connected. From the perspective of HDMI switch 102, a repeater is a sink; accordingly, operation with repeaters is not detailed separately herein.

In addition to handling CEC addressing, CEC command processor 152 translates user commands into CEC commands for controlling connected HDMI devices. For example, a user may interact with remote 142, in effect commanding that television 112 be turned on. Remote 142 translates this to "turn on the device connected to HDMI port P1. CEC command processor then translates this to a CEC "turn on" command, which it then routes to television 112 via port P1.

Other commands may require more complex actions. For example, a user may command "select DVD changer as source for television". CEC command processor 152 can then command an HDMI data switch 154 of HDMI switch 102 to configure itself so that HDMI port P4 is connected to HDMI port P1. HDMI data switch allows HDMI data but not CEC commands to pass between HDMI ports P1-P4. This eliminates problems associated with incompatible CEC command extensions and logical address conflicts and collisions. In some alternative embodiments, a CEC command processor translates commands from one HDMI device to conform to the extensions of another HDMI device, thus allowing some inter-device commands while still avoiding compatibility problems.

Figure 2:
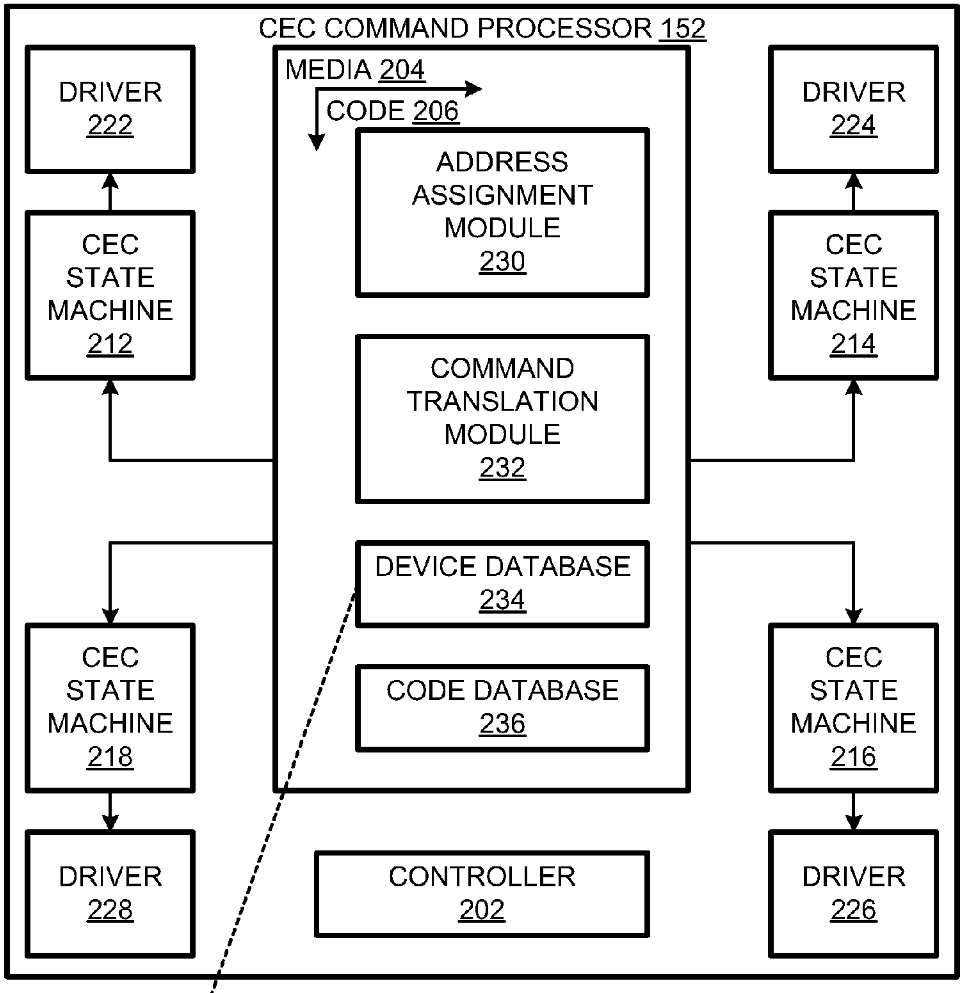
FIG. 2 is a schematic diagram of a CEC command processor of the home entertainment system of FIG. 1.

As shown in FIG. 2, CEC command processor 152 includes a controller 202, non-transitory controller-readable media 204 encoded with code 206, CEC state machines 212, 214, 216, and 218 for representing the respective states of virtual HDMI devices 122, 124, 126, and 128 (FIG. 1), and drivers 222, 224, 226, and 228 for transmitting CEC commands out ports P1-P4 (FIG. 1). Code 206, when executed by hardware controller 202 defines address assignment module 230, command translation module 232, device database 234, and code database 236. Address assignment module 230 handles address assignments during initialization. Command translation module 232 translates user commands into CEC commands that are issued to HDMI devices 112, 114, 116, 118.

Command translation module 232 access device database 234 when translating user commands into CEC commands. Device database 234 associates each port with a device type and code set (CEC commands plus manufacturer extensions). Device database 234 is typically populated automatically during address assignment.

Having determined the code set for the target HDMI device, command translation module 232 accesses code database 236, which is shown in greater detail in FIG. 3. Code database 236 is pre-populated with translations of user commands into code sets for different manufacturers, as shown. Code database 236 can be updated via a firmware update, e.g., via an installer interface. In an alternative embodiment, a code database includes user programmable sections for devices not represented in the preset code sets.

In FIG. 3, code database includes translations for several manufacturers' extended CEC code sets. Command translation module 232 knows the relevant code set (A, B, C, or D, any of which can correspond to any of the manufacturers represented in FIG. 3. Command translation module 232 can use the code set to select a table from code database 236 and then lookup the appropriate translation from that table. For example, a user can issue a command to turn on a Toshiba television (in which code set A is "Regzalink"). The desired command translation can be found in the "Toshiba Regzalink" table of code database 236.

The translation may or may not be straightforward. For example, a user command may call for turning off television 112 and all sources connected to it. Command translation module 232 may determine that cable box 116 is in use as a source for projector 114 and elect not to turn off cable box 116.

Figure 4:
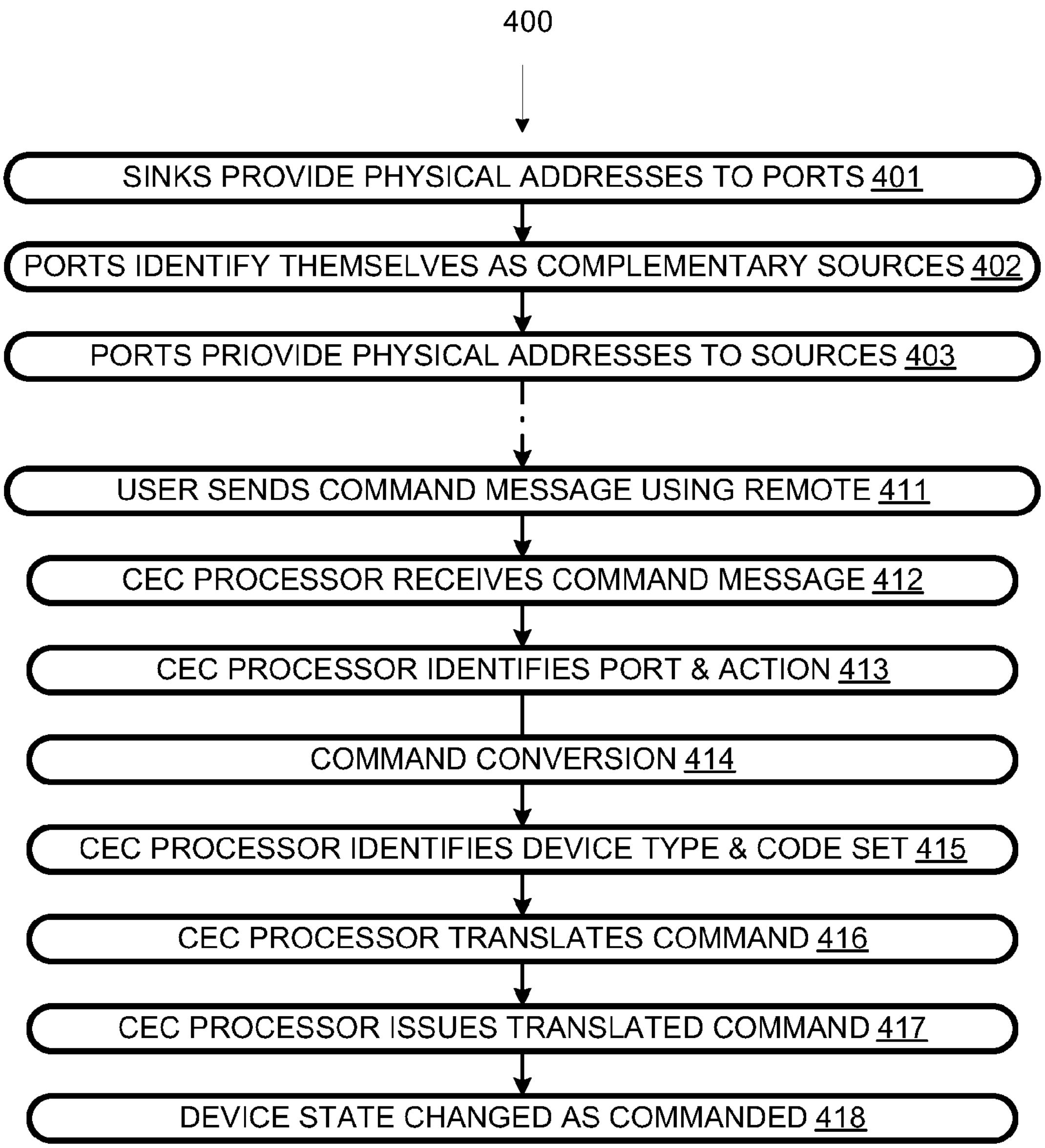
FIG. 4 is a flow chart of a process implemented in the home entertainment system of FIG. 1.

A process 400 implemented by HDMI switch 102, command processor 152, and code 206 is flow charted in FIG. 4. At 401, a sink assigns a physical address to the HDMI port to which it is connected. In the case a repeater is inserted between a sink and HDMI switch 102, the sink assigns a physical address to the repeater and the repeater assigns a physical address to the HDMI port to which it is connected. At 402, the connector port (or associated virtual HDMI device) communicates its identity to the sink or repeater that assigned its physical address. This identity is as a source from the same manufacturer as the sink or repeater. At 403, the virtual sinks assign physical addresses to HDMI sources.

In use, at 411, a user can select a device and command using a remote control, which transmits a user command to HDMI switch 102. At 412, HDMI switch 102 receives the user command. More specifically, receiver 150 receives the user command and converts it for CEC command processor 152. At 413, CEC processor 152 identifies that port and action called for by the user command.

At 414, a command conversion can be implemented. In some cases, a direct translation is performed without any conversion. For example, a simple "turn on device connected to port P2" could be implemented directly. However, in some cases, a command to turn off the device connected to port P2 may be changed to a "Power Toggle" command as the device may not have discrete power on and power off commands.

At 415, CEC processor 152 identifies the manufacturer and model number (and, thus, the device type) of the attached device and code set for the user command. At 416, CEC processor 152 translates the command. At 417, CEC processor issues the translated command. At 418, the device state of the target HDMI device is changed as commanded.

In some embodiments, a device may respond with a command of its own issued to the complementary virtual device. In process 400, this reply is discarded. However, in an alternative embodiment, commands from HDMI devices can be allowed to pass through converted or unconverted to another HDMI device or be transferred back to the user command receiver 150 to be used elsewhere (i.e. in a higher level of the control system). These and other variations upon and modifications to the illustrated embodiments are within the scope of the claims.

What is claimed is:

1. A process comprising:

High-Definition Multimedia Interface (HDMI) sinks assigning physical addresses to respective HDMI sink ports of an HDMI switch connected to said HDMI sinks;

said HDMI switch identifying said HDMI sink ports as ports belonging to HDMI sources;

said HDMI switch providing physical addresses to HDMI sources connected to HDMI source ports of said switch; and said HDMI switch preventing Consumer Electronics Control (CEC) commands from being communicated between said HDMI sink ports and said HDMI source ports while allowing HDMI data to be communicated between said HDMI sink ports and said HDMI source ports.

2. A process as recited in claim 1 wherein said identifying involves identifying each of said HDMI sink ports as belonging to HDMI sources from the same manufacturers for the respectively connected HDMI sinks so that, in the event, a first of said HDMI sink ports is connected to a first sink device from a first manufacturer and implementing a first CEC extensions and a second of said HDMI sink ports is connected to a second sink device from a second manufacturer and implementing a second CEC extensions different from said first extension, said HDMI switching identifies the first sink port as a source implementing said first CEC extensions and identifies the second sink port as a source implementing said second CEC extensions, said first CEC extensions differing from said first CEC extensions.

3. A process as recited in claim 2 further comprising:

said HDMI switch receiving a user command calling for changing the state of said first sink device, said HDMI switch translating said user command into a CEC command conforming to said first extensions; and transmitting said CEC command to said first sink device via said first sink port.

4. A process as recited in claim 3 further comprising:

said HDMI receiving in response to said CEC command a secondary command designed to change the state of an HDMI source; and preventing said secondary command from reaching an HDMI source.

* * * * *